United States Patent [19]
Brandt et al.

[11] Patent Number: 5,793,451
[45] Date of Patent: Aug. 11, 1998

[54] DISPLAY DEVICE

[75] Inventors: Peter Brandt, Babenhausen; Dietmar Tippl, Kelkheim, both of Germany

[73] Assignee: VDO Adolf Schindling AG, Frankfurt, Germany

[21] Appl. No.: 791,824

[22] Filed: Jan. 30, 1997

[30]   Foreign Application Priority Data

Jan. 31, 1996 [DE] Germany .................. 195 03 352.7

[51] Int. Cl.⁶ ...................... G02F 1/133; G02F 1/13
[52] U.S. Cl. ...................... 349/33; 349/179; 349/186
[58] Field of Search .................... 349/33, 179, 186

[56]          References Cited

U.S. PATENT DOCUMENTS

| | | | |
|---|---|---|---|
| 3,718,382 | 2/1973 | Wysocki et al. | 349/110 |
| 3,898,354 | 8/1975 | Parker | 349/33 |
| 4,277,786 | 7/1981 | Waldron | 349/33 |
| 4,378,955 | 4/1983 | Bleha, Jr. et al. | 349/33 |
| 4,491,371 | 1/1985 | Nickol et al. | 349/33 |

*Primary Examiner*—William L. Sikes
*Assistant Examiner*—Julie Ngo
*Attorney, Agent, or Firm*—Martin A. Farber

[57]           ABSTRACT

In a display device having a TN liquid crystal cell which can be illuminated by transmitted light from a source of light, the nematic liquid crystal substance of which cell contains a coloring substance. The control regions of the TN liquid crystal cell can be acted on by an actuation voltage between an actuation level and a non-actuation level of the electro-optic characteristic curve, in which connection bright signs can be shown on a dark display surface by the liquid crystal cell. The liquid crystal cell can be acted on by an actuation voltage between the actuation level and a non-actuation level in the undershoot region of the characteristic having the least transmission.

10 Claims, 2 Drawing Sheets

DISPLAY DEVICE

FIELD AND BACKGROUND OF THE INVENTION

The present invention relates to a display device having a TN liquid crystal cell which can be lit up by light transmitted light from a source of light, the nematic liquid crystal substance of which cell contains a coloring substance. Control regions of the cell can be acted on by an actuating voltage between an actuation level and a non-actuation level of the electro-optical transmission characteristic for displaying bright symbols on a dark display surface.

In such display devices it is known to act on the control regions with an actuating voltage between an actuation level at which the control region appears bright and a non-actuation level at which the control region appears dark. There is used, for non-actuation level, a region of the electro-optical characteristic curve which is located outside the undershoot region of the electro-optical characteristic curve. By virtue of the coloring substance which is admixed with the nematic liquid crystal substance, the change in color produced upon increase in temperature caused by change in the index of refraction of the liquid crystal substance is prevented in the unactuated state.

SUMMARY OF THE INVENTION

It is an object of the invention to provide a display device of the aforementioned type which shows high contrast between the actuated and non-actuated control regions with a temperature-independent constant color of the actuated control regions.

This object is achieved in accordance with the invention by acting on the liquid crystal cell with an actuating voltage between the actuation level (14) and the non-actuation level (15) in the undershoot region thereof having the least transmission.

By this development, the unactuated control regions are particularly dark so as to result in a particularly strong contrast with the actuated control regions, which appear bright, which contrast does not change because of the coloring substance even upon change in the index of refraction of the liquid crystal caused by a change in temperature.

If the TN liquid crystal cell is an STN liquid crystal cell (1) in the case of which a twisting of the orientation of the liquid crystal by 180° and more takes place, it is particularly favorable that an actuation with little voltage difference between the actuation level and the non-actuation level with a large difference in transmission and thus strong contrast is possible.

It is furthermore advantageous if the liquid crystal is a dot-matrix cell since it can then be actuated with high multiplex rates, without a reduction in the strong contrast. Furthermore, the display dots which are distributed uniformly over the entire display surface lead to a uniformly dark display field.

If the display device is illuminated by a source of white light, then the actuated control regions appear in a color which corresponds to the color of the liquid crystal cell itself. This a bluish color in the case of an STN liquid crystal cell.

When a source of colored light is used, the actuated control regions appear in an additive color mix of the intrinsic color of the liquid crystal cell and of the color of the light. By suitable selection of the color of the light, the color of the actuated control regions which is visible to the observer can thus be determined.

As source of light (18), a light-emitting diode is preferably employed. In the case of several alternately actuatable sources of light, particularly light-emitting diodes, a change in color of the display device is possible.

An influencing of the color of the mixed color of the light and the intrinsic color of the liquid crystal cell is not effected by the coloring substance of the liquid crystal cell.

The liquid crystal cell can have a coating (19) which covers a part of its front substrate and is of the same color as the color of the unactuated control regions of the liquid crystal cell. Since the color of the unactuated control regions of the liquid crystal cell itself does not change upon a change in temperature, the preferably non-transilluminatable color-coated regions and the unactuated regions of the liquid crystal cell always form a same-color uniform surface of dark color.

In this connection the color of the coating (19) is preferably black.

The coating (19) can be developed in simple manner as color print or colored foil.

Furthermore, the coating can be arranged on the front substrate of the liquid crystal cell either on the inside of the cell or on the outside of the cell.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
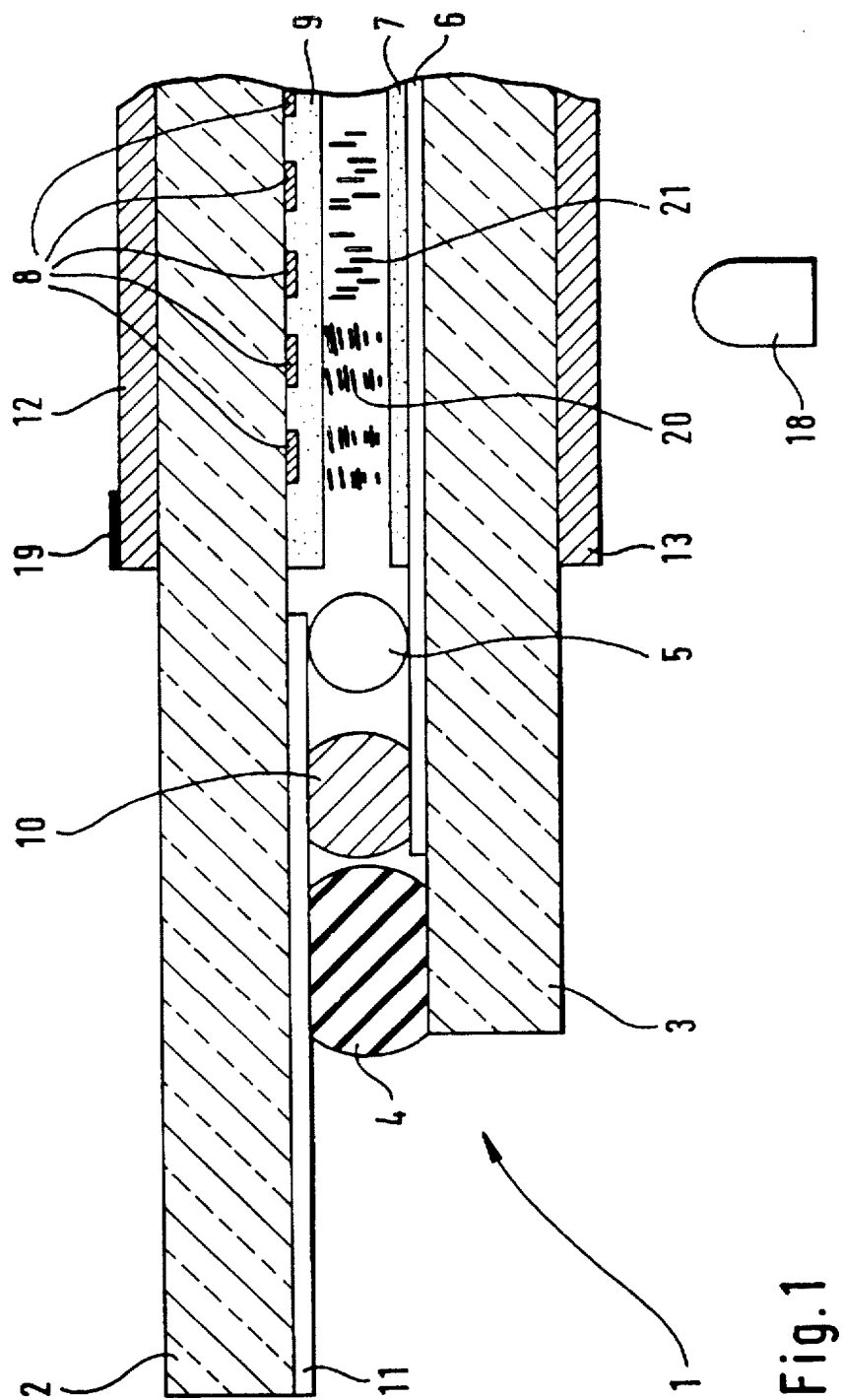
FIG. 1 is a partial cross section of a display device.

The display device shown in FIG. 1 has an STN liquid crystal cell 1 which has two transparent substrates 2 and 3 spaced from each other. On the region of its circumferential edge, the inside of the STN liquid crystal cell 1 is closed by a packing 4. Spacers 5 hold the substrates 2 and 3 a given distance apart.

The inside of the STN liquid crystal cell is filled with a liquid crystal substance 20.

On the cell sides, there are strip electrodes 6 which are covered by an orientation layer 7, and extend parallel to each other on the rear substrate 3.

On the front substrate 2, transparent strip electrodes 8 are arranged on the cell side, extending parallel to each other and at a right angle to the strip electrodes 6, the electrodes 8 being also covered by an orientation layer 9 to form a dot matrix.

In this connection, the overlapping regions of the strip electrodes 6 and the strip electrodes 8 form control regions.

The strip electrodes 6 are connected by bridging contacts 10 with control contacts 11 which are arranged on the substrate 2 and extend outward from the inside of the cell.

The strip electrodes 8 are connected by control contacts (not shown) with the outside of the cell to be acted on by multiplexing by an actuation voltage.

Polarizers 12 and 13 are arranged on the substrates 2 and 3 respectively.

From the rear, the STN liquid crystal cell 1 can be transilluminated by a source of light 18, which is a light-emitting diode.

On the front polarizer 12 there is printed a black non-transilluminatable coating 19 which covers the regions in which there are no control regions. The nematic liquid crystal substance 20 of the cell 1 may contain a coloring substance 21.

Figure 2:
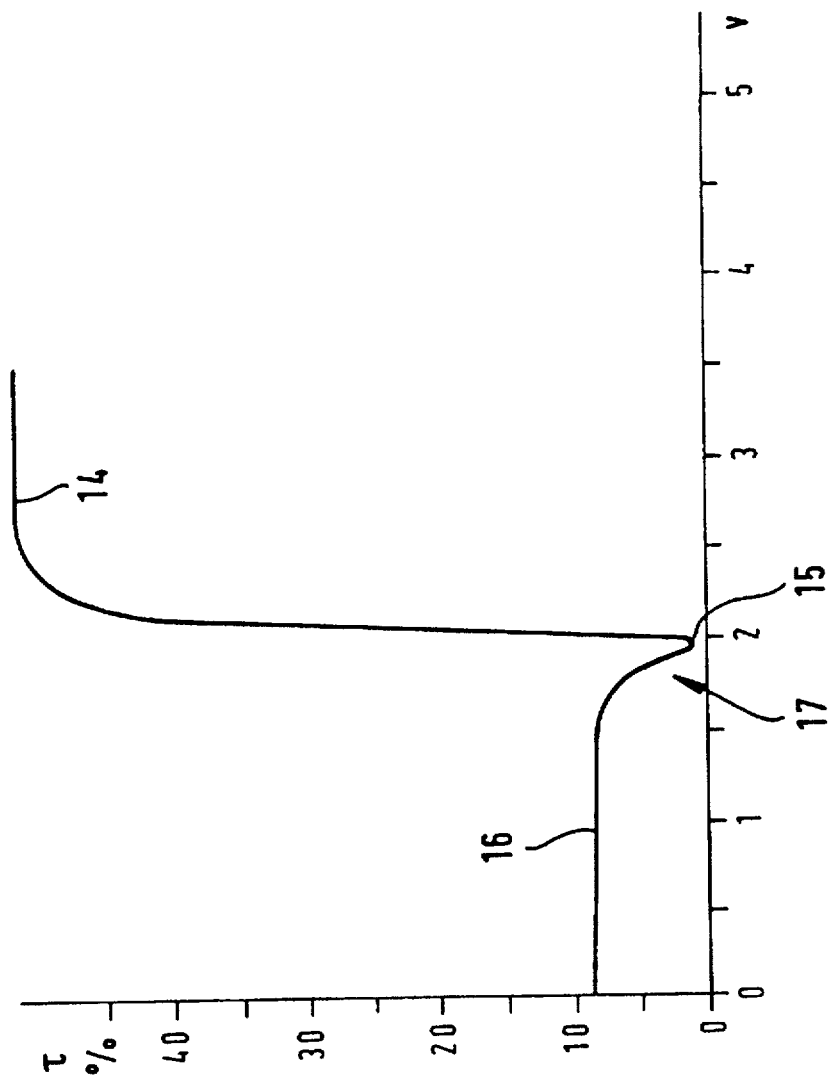
FIG. 2 is a diagram of the transmission plotted against the actuating voltage with an electro-optical characteristic curve.

The STN liquid crystal cell 1 can be acted on by an actuation voltage (FIG. 2) between an actuation level 14 and a non-actuation level 15 in the undershoot region of the transmission characteristic having the lowest transmission.

By the use of the non-actuation level in which the undershoot region 17 having the lowest transmission, which is located between the normal nonactuation level 16 in the case of low actuation voltage and the actuation level 14 in the case of higher actuation voltage, the unactuated regions appear particularly dark and with particularly high contrast with respect to the actuated regions.

TN liquid crystal cell means twisted nematic crystal cell and STN liquid crystal cell means super twisted nematic crystal cell.

The angle of twist of a super twisted nematic cell is greater than 90°.

We claim:

1. A display device having a TN liquid crystal cell which can be lit up by transmitted light from a source of light, the cell having a nematic liquid crystal substance which contains a coloring substance, wherein the cell comprises control regions which are actuatable by an actuating voltage having magnitudes between an actuation level and a non-actuation level of the electro-optical transmission characteristic; and wherein the magnitude of the actuation voltage is between the actuation level and a non-actuation level located in an undershoot region of the transmission characteristic having the least transmission, the device enabling bright symbols to be displayed on a dark display surface.

2. A display device according to claim 1, wherein the liquid crystal cell is an STN liquid crystal cell.

3. A display device according to claim 1, wherein the liquid crystal is a dot-matrix cell.

4. A display device according to claim 1, wherein the source of light is a colored light source.

5. A display device according to claim 1, wherein the source of light is a lightemitting diode.

6. A display device according to claim 1, wherein in an unactuated state of one of said control regions obtained by applying a voltage at said non-actuation level to the nematic liquid crystal substance, the nematic liquid crystal substance imparts a color to light; and the liquid crystal cell further comprises a coating which covers a part of a front substrate of the cell and is of the same color as a color of unactuated control regions of the liquid crystal cell.

7. A display device according to claim 6, wherein the color of the coating is black.

8. A display device according to claim 6, wherein the coating is a color print.

9. A display device according to claim 6, wherein the coating is a colored foil.

10. A display device having a TN liquid crystal cell which can be lit up by transmitted light from a source of light, the cell comprising a first set of strip electrodes and a second set of strip electrodes crossing said first set of electrodes at crossover points and being spaced apart from said first set of electrodes, the cell further comprising a nematic liquid crystal substance disposed between said first set of electrodes and said second set of electrodes, said nematic liquid crystal substance containing a coloring substance, crossover points between electrodes of said first and said second sets defining respective control regions of the cell, each of said crossover points being responsive to an applied voltage for controlling electrically an optical transmission characteristic of a region of said nematic liquid crystal substance located at said crossover point;

wherein respective ones of said control regions of the cell are actuatable by an actuating voltage having magnitudes between an actuation level and a non-actuation level of the electro-optical transmission characteristic, a voltage at said actuation level inducing at a respective one of said crossover points a state of optical transmission in said nematic liquid crystal substance, and a voltage at said non-actuation level terminating the state of optical transmission in said nematic liquid crystal substance at said respective one of said crossover points, said nematic liquid crystal substance has an electro-optical transmission characterized by a state of reduced transmission at a relatively low voltage at said non-actuation level and a state of increased transmission at a relatively high voltage at said actuation level and a state of essentially no transmission at a voltage magnitude between said high and said low voltage levels, said state of essentially no transmission being an undershoot region in a relationship in said nematic liquid crystal substance between optical transmission and applied voltage; and wherein the magnitude of the actuation voltage is between the actuation level and a non-actuation level located in said undershoot region of the transmission characteristic having the least transmission, the device enabling bright symbols to be displayed on a dark display surface.

* * * * *